March 23, 1971 A. T. KISSEN 3,572,331
IMPENDING HYPOXIA DETECTION AND WARNING
SYSTEM FOR AIRCRAFT PERSONNEL
Filed June 25, 1969 10 Sheets-Sheet 1

INVENTOR.
ABBOTT T. KISSEN
BY Harry A. Herbert Jr.
Robert Kern Duncan
ATTORNEYS

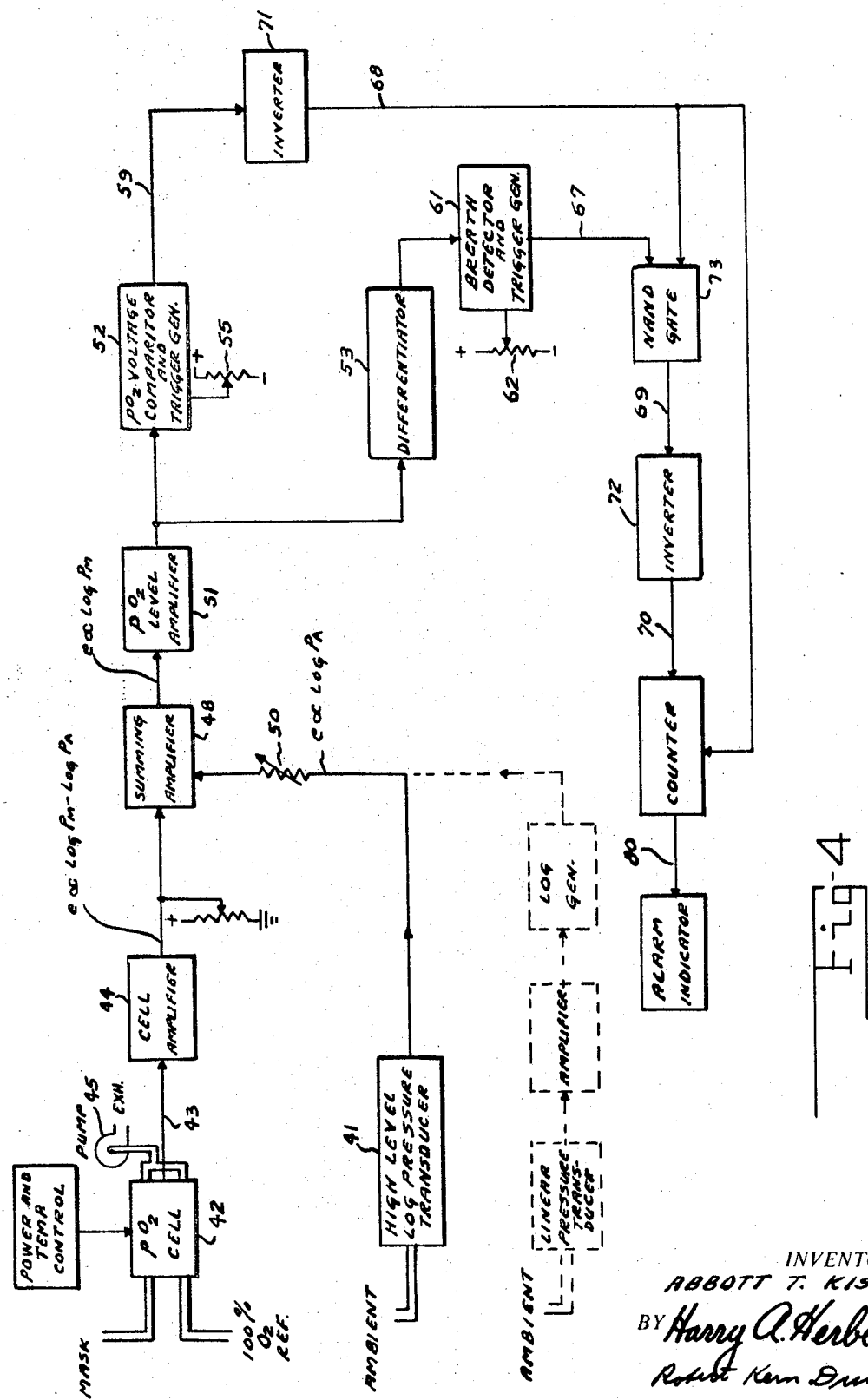

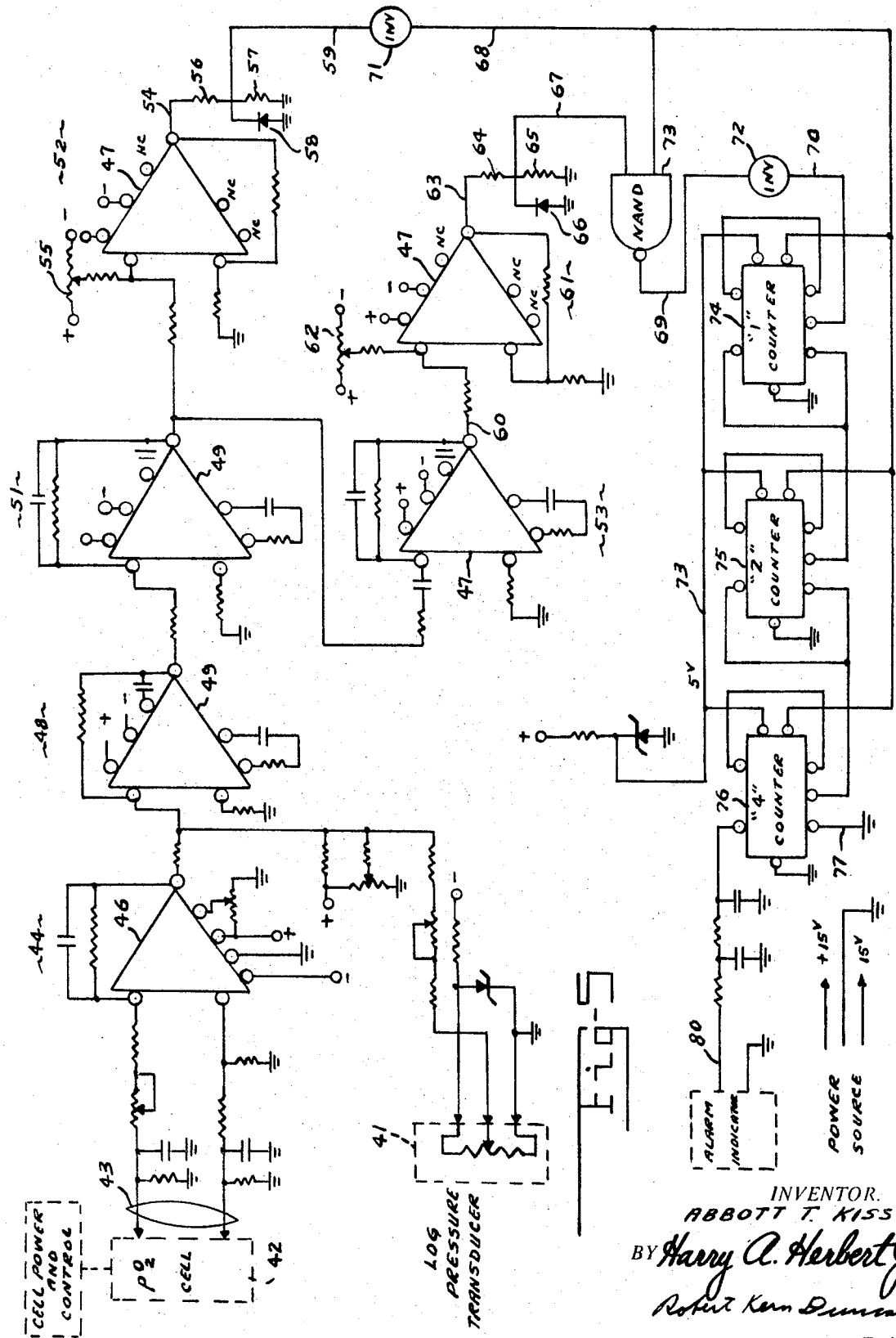

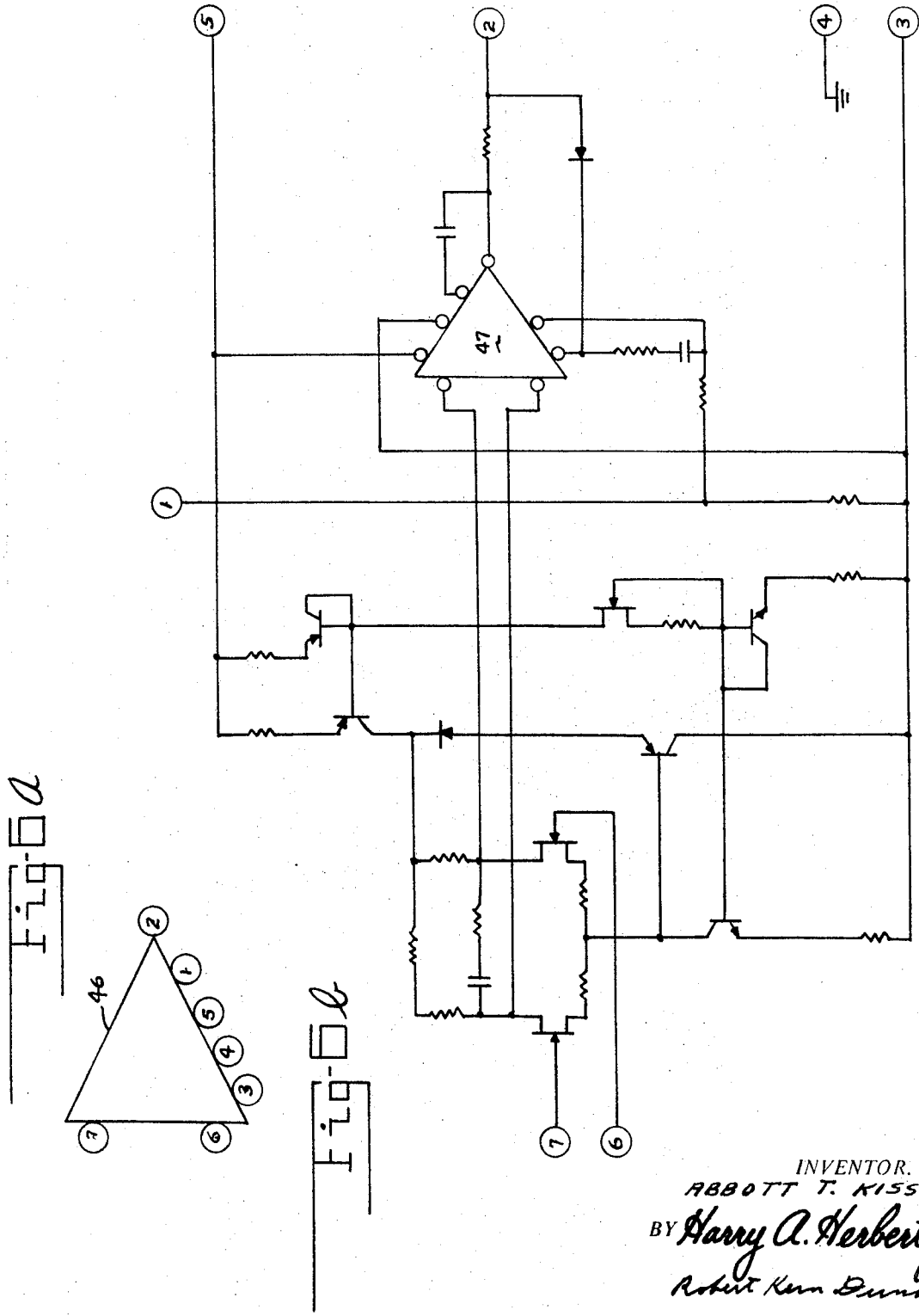

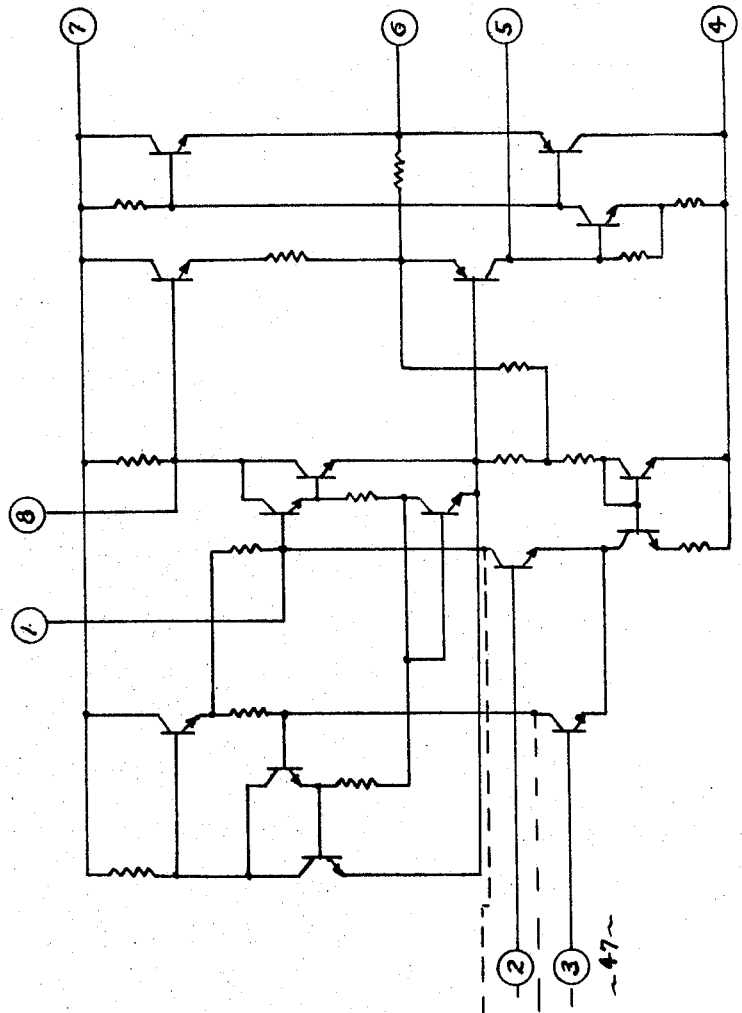
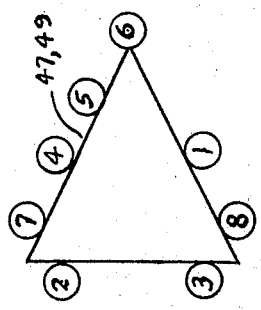
Fig-7a
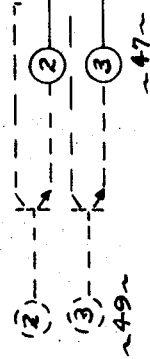
Fig-7b
INVENTOR.
ABBOTT T. KISSEN
BY Harry A. Herbert Jr
Robert Kern Duncan
ATTORNEYS

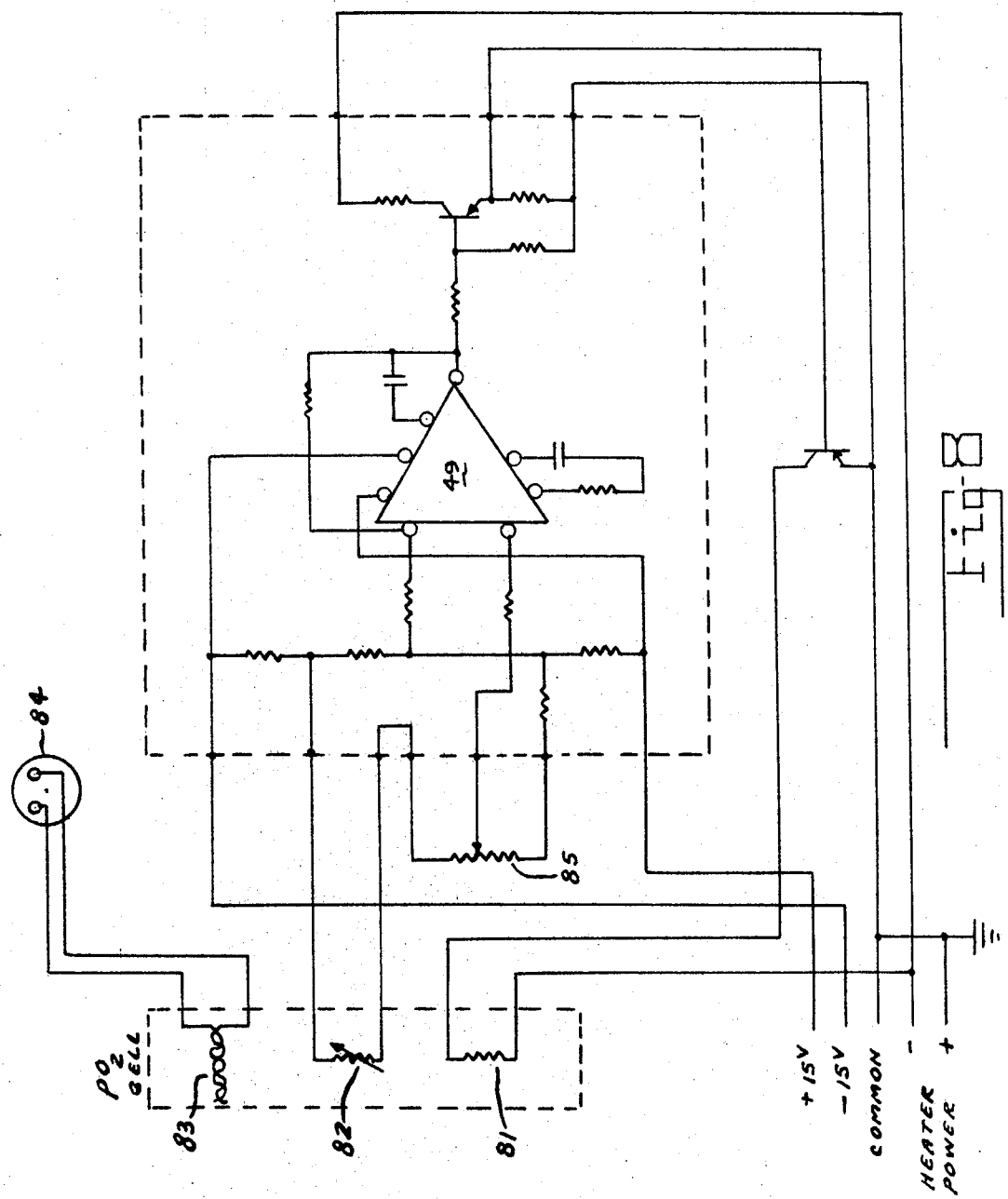

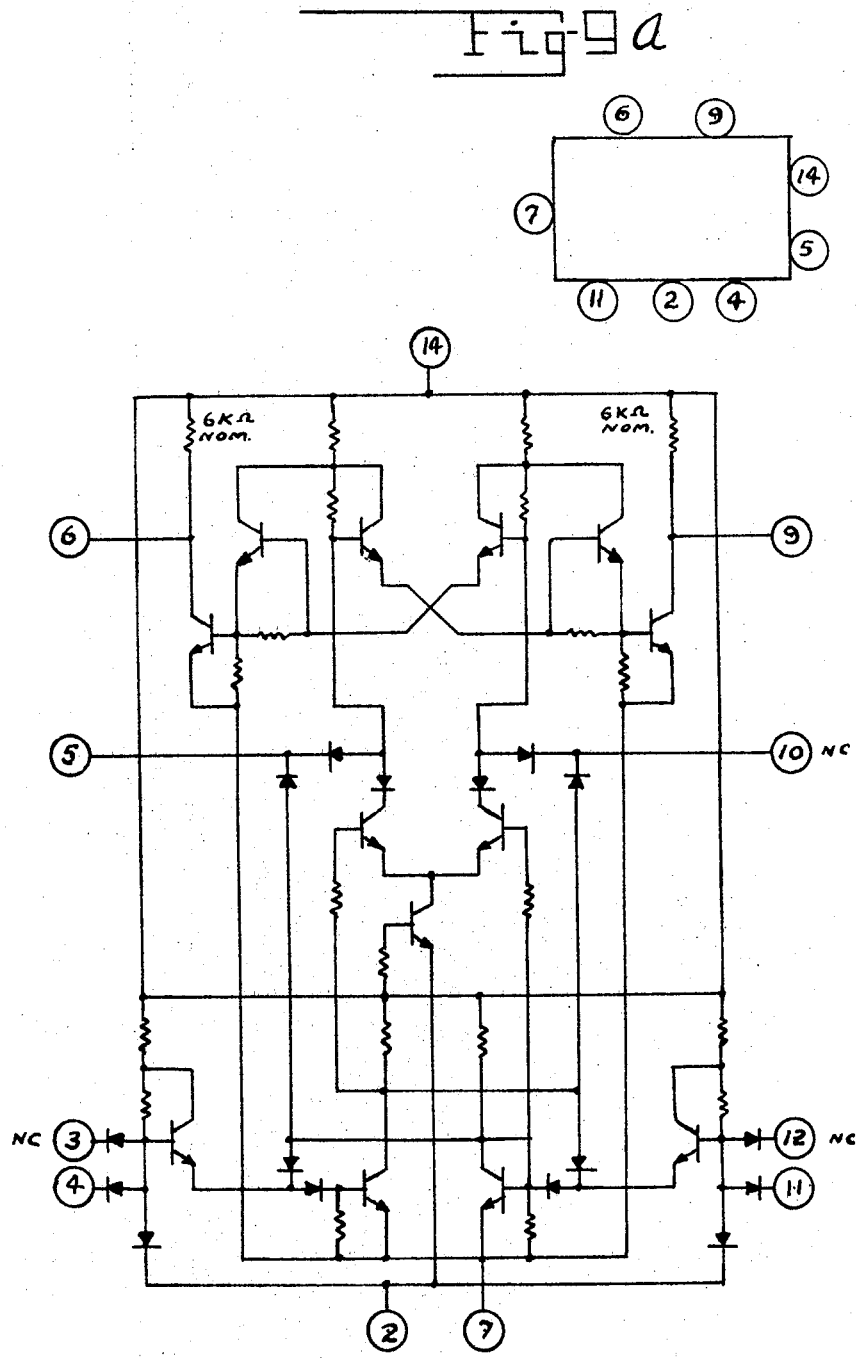

March 23, 1971 A. T. KISSEN 3,572,331
IMPENDING HYPOXIA DETECTION AND WARNING
SYSTEM FOR AIRCRAFT PERSONNEL
Filed June 25, 1969 10 Sheets-Sheet 9
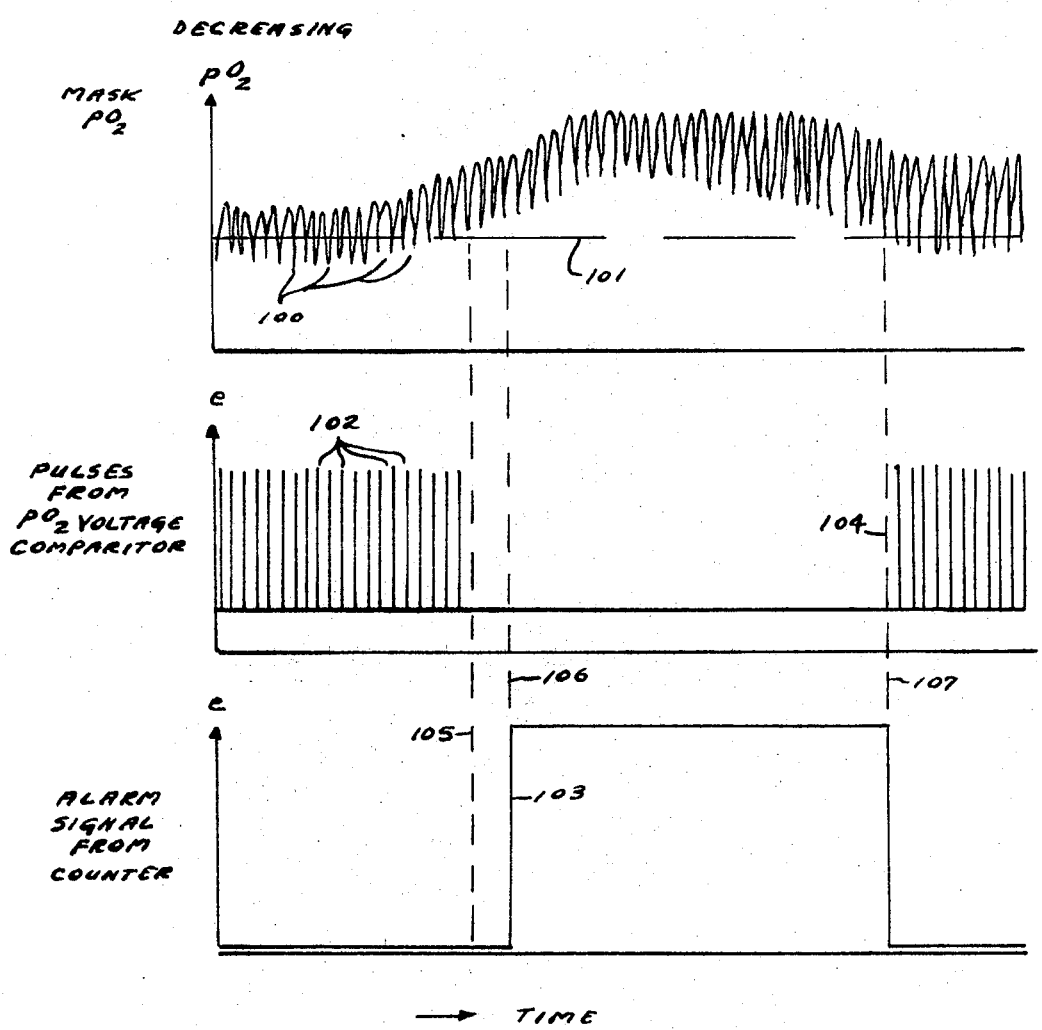
INVENTOR.
ABBOTT T. KISSEN
BY Harry A. Herbert Jr
Robert Kern Duncan
ATTORNEYS INVENTOR.
ABBOTT T. KISSEN
BY Harry A. Herbert Jr
Robert Kern Duncan
ATTORNEYS United States Patent Office 3,572,331
Patented Mar. 23, 1971

3,572,331
IMPENDING HYPOXIA DETECTION AND WARNING SYSTEM FOR AIRCRAFT PERSONNEL
Abbott T. Kissen, 1727 Parkhill Drive, Dayton, Ohio 45406
Filed June 25, 1969, Ser. No. 843,901
Int. Cl. A62b 9/00
U.S. Cl. 128—142   5 Claims

ABSTRACT OF THE DISCLOSURE

Each breath of the subject is monitored by a dry electrolyte oxygen partial pressure ($pO_2$) sensing cell having millisecond response characteristics. An electronic circuit responsive to the oxygen sensor counts breaths exhibiting maximal partial pressure of oxygen values below an electronically preset equivalent partial pressure of oxygen, and after a predetermined number of successive counts an alarm circuit is energized until the oxygen partial pressure rises above the predetermined level.

BACKGROUND OF THE INVENTION

The field of this invention is in subjective physiological warning instrumentation.

Hypoxia in the pilot and crew of aircraft is a major cause of accidents. Previously there has not been a satisfactory airborne hypoxia warning system. A subject has no reliable means of detecting impending hypoxia by his own senses. In fact, in many cases, hypoxia has already occurred to the extent of physical and mental impairment without the subject being aware that the condition is existing.

SUMMARY OF THE INVENTION

An alarm is activated warning a subject of impending hypoxia when the oxygen partial pressure in the subject's face mask remains below a predetermined maximum value for a predetermined number of successive breaths. Oxygen partial pressure above the predetermined value removes the alarm signal and resets the system. (Upon receiving an alarm indication, the subject knows that he is not receiving sufficient oxygen for him to maintain his normal responses. This condition may be brought about by a faulty oxygen pressure regulator, a defective hose coupling, a defective oxygen supply source, a defective valve in the face mask, a leak in the oxygen system (perhaps brought about by battle damage), lack of a seal between the face mask and wearer, or other defect or fault in his oxygen supply system. The subject then has a relatively short interval of time, before his responses deteriorate, in which to locate and correct the trouble (or to descend to a safe altitude).

BRIEF DESCRIPTION OF THE DRAWINGS

FIG. 3 is a simplified block diagram of an embodiment of the invention;

FIG. 4 is a detailed block diagram of an embodiment of the invention;

FIG. 5 is a detailed partial schematic diagram of an embodiment of the electronics of the invention using integrated circuit modules;

FIGS. 6a and 6b show a detailed schematic circuit of a typical input module for receiving the $pO_2$ cell output as shown in FIG. 5;

FIGS. 7a and 7b show a detailed typical schematic circuit of two of the integrated circuit operational amplifier modules;

FIG. 8 is a detailed schematic diagram of an embodiment of the temperature control system for the $pO_2$ cell;

FIGS. 9a and 9b show a detailed schematic circuit of a typical counter module of FIG. 5;

FIG. 10 is a graphical plot showing an electrical mode of operation initiating the alarm indication;

DESCRIPTION OF THE PREFERRED EMBODIMENT

This invention samples the gas inside an oxygen mask and when the maximum oxygen partial pressure drops below a predetermined value for a predetermined number of breaths it causes an alarm indication to be presented. Four or more breaths at a maximum oxygen partial pressure of less than 116 mm. of mercury is a representative setting of the device for alarm indication for general usage. As will be further explained other values of the parameters of oxygen partial pressure and number of breaths below that value, may be used to activate the alarm. Obviously, the oxygen partial pressure in the mask will be highest at the cessation of inhalation and lowest at the cessation of exhalation.

Generally oxygen is not used by aircraft personnel below approximately eight thousand feet altitude. At 8,500 feet altitude the partial oxygen pressure of normal air becomes approximately 116 mm. of mercury. It is generally considered that at approximately this amount of oxygen human responses start to deteriorate and with less than this amount conventionally available oxygen must be supplied to a person if he is to maintain his normal responses. At approximately 45,000 feet altitude the total air pressure is approximately 116 mm. of mercury; therefore, at altitudes above this value even though a person is breathing pure 100% oxygen (in a demand type mask) he will not get enough for his normal body requirements, and the cabin must be pressurized. When the cabin is pressurized the regulating valves supplying oxygen to a mask then maintain the oxygen pressure to the mask at cabin pressure. For instance, in an aircraft operating at 60,000 feet altitude, the cabin may be pressurized to an equivalent 15,000 feet altitude, and as far as the human body is concerned it is at 15,000 feet altitude. As will be apparent from the further description of this invention, the invention herein disclosed will properly function and give a warning indication of impending hypoxia whenever the atmosphere in the mask contains insufficient oxygen for the predetermined number of breaths, whether it be brought about by one of the causes previously mentioned or by loss, or partial loss, of pressurization of the aircraft.

Figure 1:
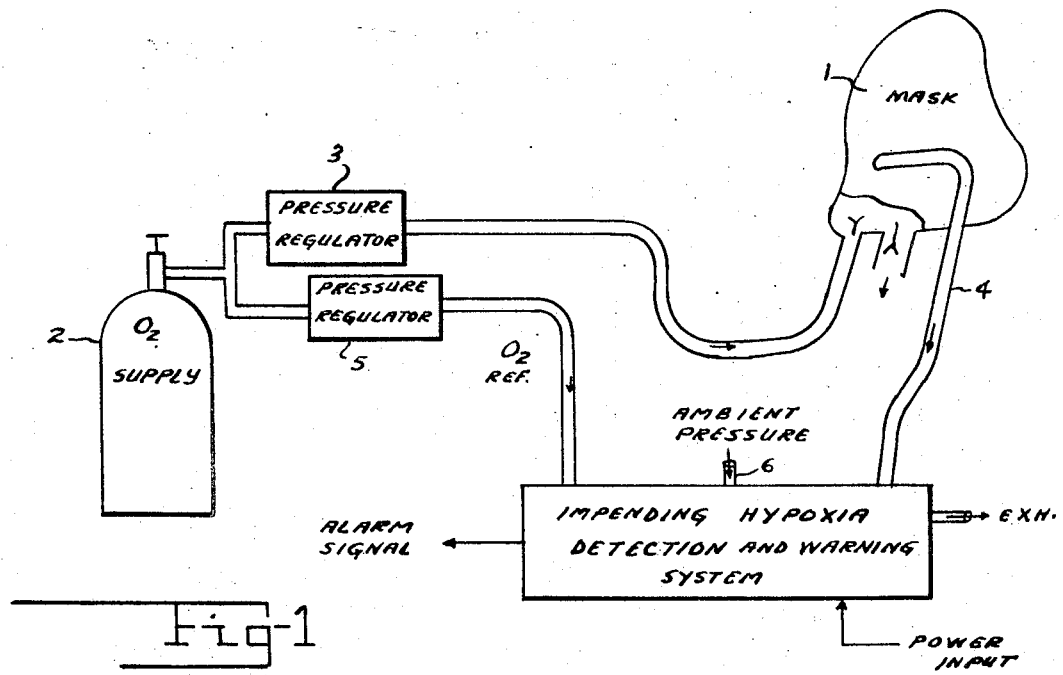
FIG. 1 is a pictorial representation showing how the invention cooperates with the life support oxygen supply of an aircraft subject.

An embodiment of the overall oxygen supply system incorporating this invention is shown in FIG. 1. The demand type face mask 1 supplies the nose and mouth of the wearer with oxygen gas from the supply canister 2 regulated to the ambient cabin pressure by conventional pressure regulating valve 3. The inputs to the apparatus of this invention are, sampling gas drawn from the interior of the face mask through flexible small hose line 4; reference gas containing a known percentage of oxygen at a known pressure, which may conveniently be pure 100% oxygen, regulated to the same ambient pressure, (in the illustration shown in FIG. 1, the pressure regulator 5 may be essentially identical with the pressure regulator 3); and input 6 to a pressure transducer for measuring the ambient pressure. (And, of course, the necessary electrical power.) A small pump within the system continuously draws in the small samples of mask gas and reference gas and exhausts to the ambient atmosphere.

The output of the device is an alarm signal to warn the mask wearer when conditions of impending hypoxia exist. The reference gas may be taken from the line from the pressure regulator 3 supplying oxygen to the mask. However, by using a separate regulator 5 a more reliable system is had due to the ability of the system to warn of leaks or malfunctions of the mask regulator.

Figure 2:
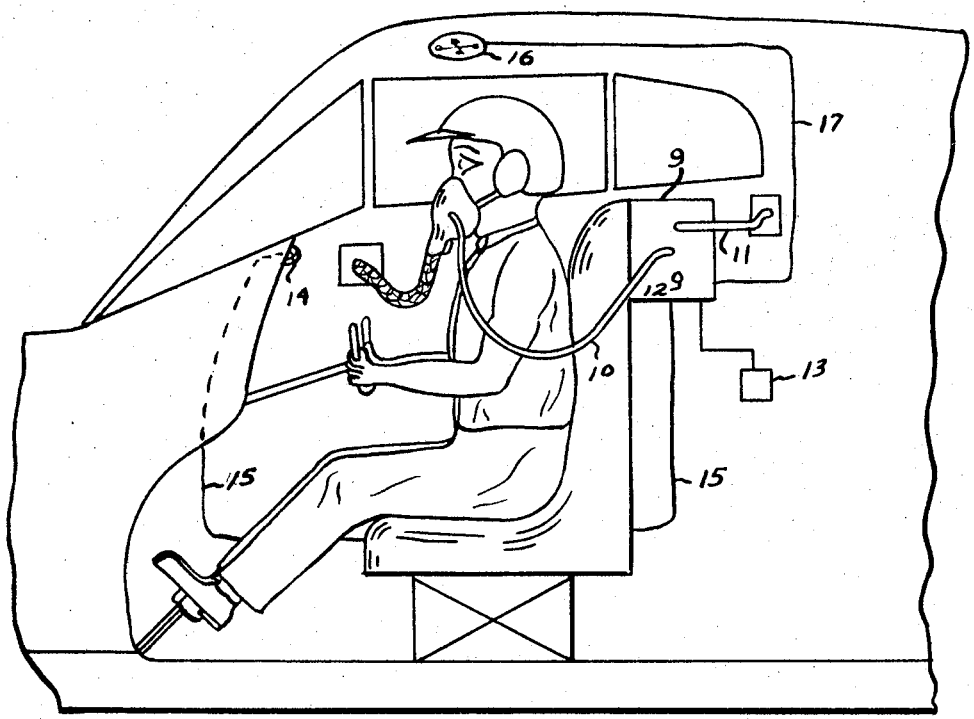
FIG. 2 is a pictorial representation of a typical installation of the invention in an aircraft.
Figure 2:
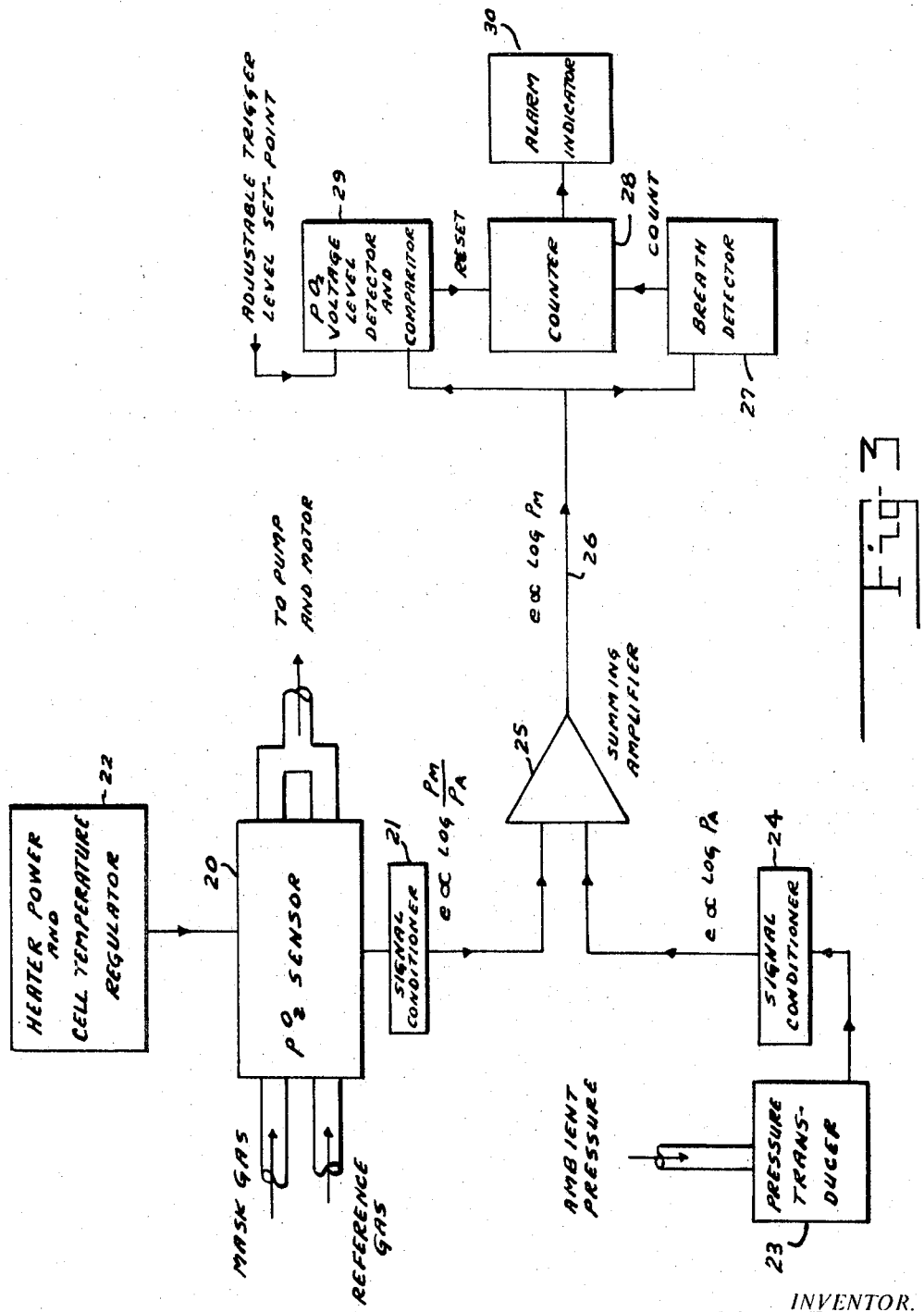

FIG. 2 shows a pictorial representation of a typical installation of the invention in an aircraft. The oxygen partial pressure sensing cell and the electronic circuitry of the invention are within the small container 9 mounted on the back of the aircraft seat. Sampling gas from the face mask is drawn in through small hose 10, reference gas through hose 11, and the ambient pressure is sampled through opening 12. Power for the system is taken from the aircraft power at outlet 13. The exhaust of the sampled mask gas and the reference gas from the pump is through a small opening in the back side of the container 9. A warning of impending hypoxia is presented by the illumination of dash warning light 14 connected to the apparatus by electrical line 15, and by the sounding of warning buzzer 16 connected by electrical line 17. Other embodiments supply an electrical warning signal to the earphones, and automatically switch the breathing system to a new oxygen supply canister. The regulator placing the reference gas supply at the ambient pressure may be within the container 9, in which case line 11 carries high pressure oxygen, or the regulator may be mounted elsewhere in the cabin. In the latter case, which is generally considered more desirable, the line 11 is not under pressure. The exit of hose 10 into the mask should be so as to sample the atmosphere generally in front of the nose and mouth of the wearer. This is not critical as long as it doesn't open into a pocket along the cheek or high on the nose. If due to the structure of the mask it is desirable for the hose to enter the mask relatively high, the tube may extend down within the mask to a more central portion. Of course, the sampling tube must be sealed to the mask wall.

FIG. 3 shows a simplified block diagram of the invention. The oxygen partial pressure sensing cell 20 is a well-known dry electrolyte platinum electrode type. The cell is accurately calibrated for measuring partial oxygen pressures over a range of approximately 90 to 150 mm. of mercury and has millisecond response time sufficient to essentially follow the partial oxygen content in the mask during the inhalation and exhalation of the wearer. The cell is responsive to and not impaired by operation over the complete range of $pO_2$ values from approximately zero $pO_2$ pressure to full atmospheric pressure of 760 mm. of mercury. An early form of such an oxygen partial pressure sensing cell is described in National Aeronautics and Space Administration Report, NASA CR–534, entitled, "Flight Type Oxygen Partial Pressure Sensor," for sale by the Clearinghouse for Federal Scientific and Technical Information.

The output of the oxygen partial pressure sensor 20 is a voltage proportional to the logarithm of the ratio the partial pressure of the oxygen in the mask gas and the partial pressure of the oxygen in the reference gas. As previously stated, the reference gas may be gas with a known concentration of oxygen and at a known pressure. It is preferable, though not necessary, to use the same type oxygen gas for the reference gas as is used for subjective consumption, commonly referred to as 100% pure oxygen, and pressure regulate it to the same pressure as furnished the mask, i.e., the ambient pressure. In the preferred embodiment being disclosed this is the condition, thus the mask gas, without any malfunctions, if the wearer were not breathing, would be 100% pure oxygen and identical with the reference gas. In this embodiment they are both drawn from the same gas canister. As the subject breathes the oxygen partial pressure in the mask varies from a maximum value at the end of inhalation to a minimum value at the end of exhalation. This is shown graphically in the upper curve of FIG. 10, with the individual portions of the curve having positive slopes being exhalations and that portion having negative slopes being inhalations. Steady breathing, without conversation, was taking place.

Since the reference gas in the embodiment is essentially 100% pure oxygen regulated to the ambient pressure, the logarithm of the oxygen partial pressure in the reference gas is the logarithm of the ambient pressure. If the oxygen partial pressure of the mask gas is represented by $P_M$ and the oxygen partial pressure of the reference gas by $P_A$ (which is the ambient pressure), then the output of the oxygen partial pressure sensor is proportional to a voltage $e$ that may be represented:

$$e \alpha \log \frac{P_M}{P_A}$$

or $$e \alpha \log P_M - \log P_A$$

The signal conditioner 21 (FIG. 3) represents the electronic circuitry for amplifying the output of the sensing cell and adjusting the levels and impedances of the signal. The signal after passing the signal conditioner is still a voltage proportional to the difference of the logarithm of the mask gas and the logarithm of the reference gas. The block 22, heater power and cell temperature regulator, represents the conventional circuitry for heating and regulating the temperature of the sensing cell to the required temperature of operation; approximately 850 degrees centigrade for the particular embodiment being described.

The pressure transducer 23 monitors the ambient pressure in the aircraft cabin, the same pressure to which the regulator valves maintain the oxygen supply to the mask and reference gas supply. Two types of conventional pressure transducers have proven very satisfactory. The first type is a conventional linear transducer followed by logarithmic amplification. The second type is a conventional high-output variable resistance logarithmic transducer. The second type is generally preferred due to the simplification in the circuitry. The signal conditioner 24 in the second case may merely be a level adjusting means. In the first case (with linear transducer) it must be amplification means to provide a voltage proportional to the logarithm of the ambient pressure. (FIG. 4 shows this in more detail.) In either case the voltage from the signal conditioner 24 is a voltage proportional to the logarithm of the ambient pressure, adjusted in level such that when this logarithmic voltage is summed with the voltage from the signal conditioner 21 in the summing amplifier 25 it effectively removes the logarithm of the reference gas and leaves as an output only the logarithm of the oxygen partial pressure in the mask. This may be represented:

$$\log P_M - \log P_A + \log P_A = \log P_M$$

The voltage on line 26 from the summing amplifier is a varying voltage, following the variations in the oxygen partial pressure in the mask during each inhalation and exhalation. A plot of this voltage is shown in the upper curve of FIG. 10. From this varying voltage two parameters are extracted; the maximum oxygen partial pressure at the cessation of each inhalation, represented by the downward peaks 100 of the curve; and a breath count. The breath detector 27 (FIG. 3) counts each breath and provides a counting pulse to the counter 28. Counts may either be made of inhalations or exhalations. It has been found to be preferable to make the counts from detected inhalations rather than exhalations due to false counts sometimes occurring when counting exhalations when the subject modulates his exhalation with speech in communicating. The breath detector 27 places a count in the counter 28 with each breath of the subject.

The oxygen partial pressure voltage level detector 29 provides reset pulses to the counter (removing and inhibiting the count) as long as the maximum oxygen partial pressure is above a predetermined value. When the maximum oxygen partial pressure drops below the predetermined value, no reset or inhibiting pulse is sent to the counter and it proceeds to count. After the predetermined number of counts the counter provides a signal to the alarm indicator 30 warning the subject of the condition of impending hypoxia. These conditions are shown graphically in FIG. 10. As previously explained, a typical embodiment has the minimum, safe maximum oxygen partial pressure set at 116 mm. of mercury, represented by line 101. Whenever this value of oxygen partial pressure exists in the mask a pulse 102 from the comparitor resets and inhibits the counter. When the oxygen partial pressure drops below the preset minimum values, the comparitor does not generate a pulse and the counter continues to count breaths. In this particular embodiment, four consecutive breaths below this amount has been set as the criteria for a warning of impending hypoxia. Thus after four breath counts the counter provides a voltage 103 to the alarm indicator circuitry. The counter continues to furnish this output, regardless of the number of successive counts, until the oxygen partial pressure rises to the predetermined safe level, when a pulse 104 from the comparitor resets the counter removing the signal to the alarm indicator. In FIG. 10 the first breath to fall below the line 101 is the breath at time line 105. Note that no pulse is generated in the comparitor. Four breaths later, represented by time line 106, the counter supplies the alarm signal 103. At time line 107 the maximum oxygen partial pressure has reached the predetermined amount 101, a reset pulse 104 is generated, and the alarm signal 103 is removed.

FIG. 4 is a detailed block diagram of the described embodiment. The electronic circuitry of this embodiment, using integrated circuit modules, is shown in FIG. 5. The schematic diagram of FIG. 5 shows the high level log transducer 41 for measuring the ambient pressure. The dotted blocks of FIG. 4 depict the use of a linear ambient pressure transducer and the associated circuitry for providing the desired logarithmic voltage. The conventional oxygen partial pressure cell has an input and output tube connection for each the reference gas and the gas being measured. In addition to the signal leads 43 connecting the cell with the cell amplifier 44, the cell, referring now to FIG. 8, has a heating element 81, a resistive temperature sensing element 82, usually platinum, and a thermocouple element 83, usually Chromel-Alumel, for connection to a pyrometer temperature indicator 84. The pyrometer is only used in the placing-in-operation stage for adjusting the potentiometer 85 in the electronic temperature regulator circuitry to maintain the cell at its required operating temperature (conventionally 850 degrees centigrade). The pump 45 (FIG. 4) may be any small conventional pump for drawing the sampled gases through the cell. A small motor-driven diaphragm type pump has proven very satisfactory. Only a very small quantity of air is needed for the cell, thus the small flexible tubes 10 and 11 (FIG. 2) can be less than $\frac{1}{16}$ inch inside diameter, and the volume of gas pumped is quite low. In a particular embodiment, the sampling tube from the mask to the $pO_2$ cell and the sampling tube from the pressure regulator to the cell had $\frac{1}{32}$ inch inside diameters. They were made the same lengths, approximately three feet, to preclude any pressure drop differential due to a difference in flow resistance within the tubes. A gas flow rate of 30 cc./min. through each tube gave very satisfactory operation.

The cell amplifier 44 in this embodiment has a voltage gain of approximately 21 and contains the integrated circuit module 46 (FIG. 5), which is a type ADO27B module shown in detail in the schematic diagram of FIGS. 6a and 6b. FIG. 6a shows the numbered connection corresponding with the number of FIG. 6b and as positioned in FIG. 5. This module 46 shown schematically in FIG. 6b contains another module 47 which is a type 709 module shown schematically in FIG. 7b (without the Darlington input stage, shown dotted). The connection terminal arrangement relationship of FIG. 7b with FIG. 7a is as previously explained. The output of the cell amplifier 44 is a voltage proportional to the difference of the logarithms of the mask gas and reference gas as previously explained.

The logarithmic output voltage of the ambient pressure transducer is adjusted by variable resistance 50 (FIG. 4) to correspond with the effective logarithmic voltage of the reference gas so that the output of the summing amplifier 48 is only the logarithm of the mask gas. This adjustment is made in the initial setting in operation of the equipment. The integrated circuit module 49 used in the summing amplifier 48 is shown schematically in FIG. 7b. It is a conventional type 801 module. It has the Darlington input as shown dotted in FIG. 7b. The output of the summing amplifier is further amplified in level by amplifier 51 containing another type 801 module. In this particular embodiment amplifier 51 has a gain of ten. The output of amplifier 51 is divided, one channel going to voltage level comparitor and trigger generator 52, the other going to the differentiator 53.

The comparitor and trigger generator 52 effectively monitors the $pO_2$ level and provides a bi-level output voltage on line 54. In this embodiment the bi-level voltage on line 54 is a $+14$ volt D.C. voltage when the $pO_2$ level is above a predetermined amount and a $-14$ volt D.C. voltage when the $pO_2$ level is below the predetermined amount. The predetermined voltage at which output changes polarity is set by potentiometer 55. Thus in this embodiment a typical setting of the potentiometer 55 is that which provides a switch to a positive voltage when the oxygen partial pressure level in the mask is at and above 116 mm. of mercury. In placing the invention in operation this calibation adjustment may either be made by using a known oxygen content of gas feeding the cell through the mask gas inlet, or by using another oxygen partial pressure measuring system such as is available in the laboratories (the fact that the system used in calibration has slow response characteristics is immaterial in making the calibration of the invention), or since the $pO_2$ cell as purchased generaly is accompanied by a calibration curve expressing its output, in millivolts, vs. the $pO_2$ content of the gas at the one inlet when a stipulated reference gas is at the other inlet, a millivolt meter may be bridged across the cell output and the potentiometer 55 calibrated (by noting when switching occurs) in terms of mm. of $pO_2$ as various oxygen gas mixtures are fed into the one gas input to the cell, with the reference gas at the other input. The output from the comparitor is divided down in the resistance network 56, and 57, and through the clamping action of diode 58 positive trigger voltages of amplitude suitable for the counting circuit are provided on line 59.

The output from the amplifier 51 is differentiated by differentiator 53. It also contains a type 709 integrated circuit module 47. (The schematic diagram as is shown in FIG. 7b, without the Darlington input circuit.) This differentiator produces a voltage proportional to the time-rate-of-change of log $pO_2$ with the voltage output at line 60 swinging positive during inhalations and swinging negative during exhalations.

The breath detector and trigger generator 61 provides a bi-level voltage of either $+14$ v. D.C. or $-14$ v. D.C., thus the voltage on line 63 swings from a negative 14 volts to a positive 14 volts with each breath. Whether this swing occurs during an inhalation or exhalation is controlled by the setting of potentiometer 62. When the arm of the potentiometer is to the positive side of the virtual ground potential position inhalations are counted and when to the negative side of the virtual ground potential position exhalations are used for the breath counts. The advantage of using inhalations has previously been discussed. Further adjustment of the potentiometer allows an optimum position to be established to account for small circuit variations and provides reliable switching of the bi-level voltage with each breath. A voltage dividing network 64, 65, and clamping diode 66 are used with the output of the breath detector 61 to provide positive trigger voltages of the right amplitude on line 67 for the counting circuit.

Positive pulses appear on line 67 for each breath. Positive pulses appear on line 59 only when the $pO_2$ is above the predetermined level. The logic in this embodiment is for four consecutive breath counts having the $pO_2$ below the predetermined amount to provide a signal to activate the alarm, a breath having satisfactory $pO_2$ removes the alarm signal, and it also resets the counter whether the alarm is on or not (such as when on a count of two or three), and breaths having satisfactory $pO_2$ inhibit the counter from counting. Expressed in symbolic logic notation, the positive (ON) pulses on lines 69 and 67 being represented by "1" and lack thereof (OFF) being expressed of "0," the following "truth" table may be prepared.

| Mask situation | \multicolumn{5}{c}{Line} | Result of counter |
|---|---|---|---|---|---|---|
| | 59 | 67 | 68 | 69 | 70 | |
| Satisfactory $pO_2$ | 1 | 1 | 0 | 1 | 0 | Inhibited-reset. |
| Dangerous $pO_2$ | 0 | 1 | 1 | 0 | 1 | Counts. |

Figure 11:
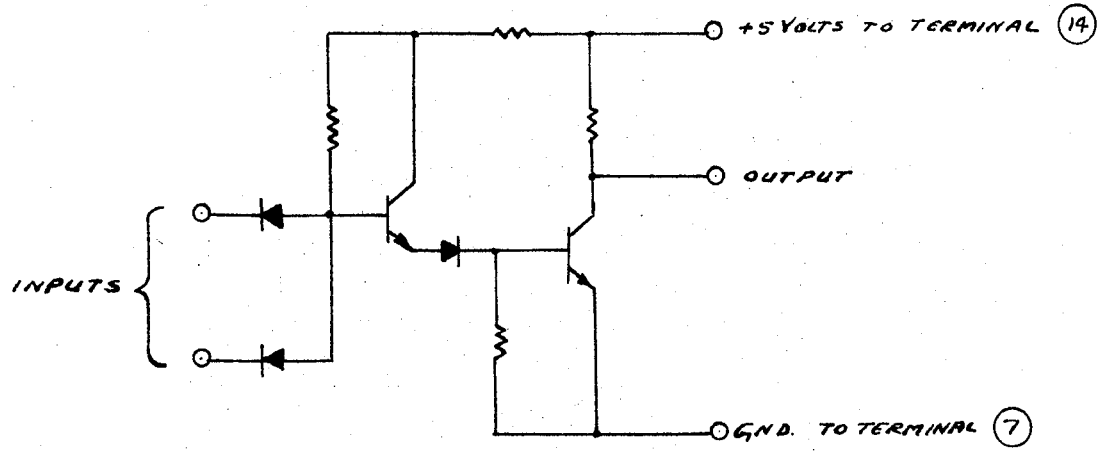
FIG. 11 is a schematic diagram of a NAND gate.
Figure 12:
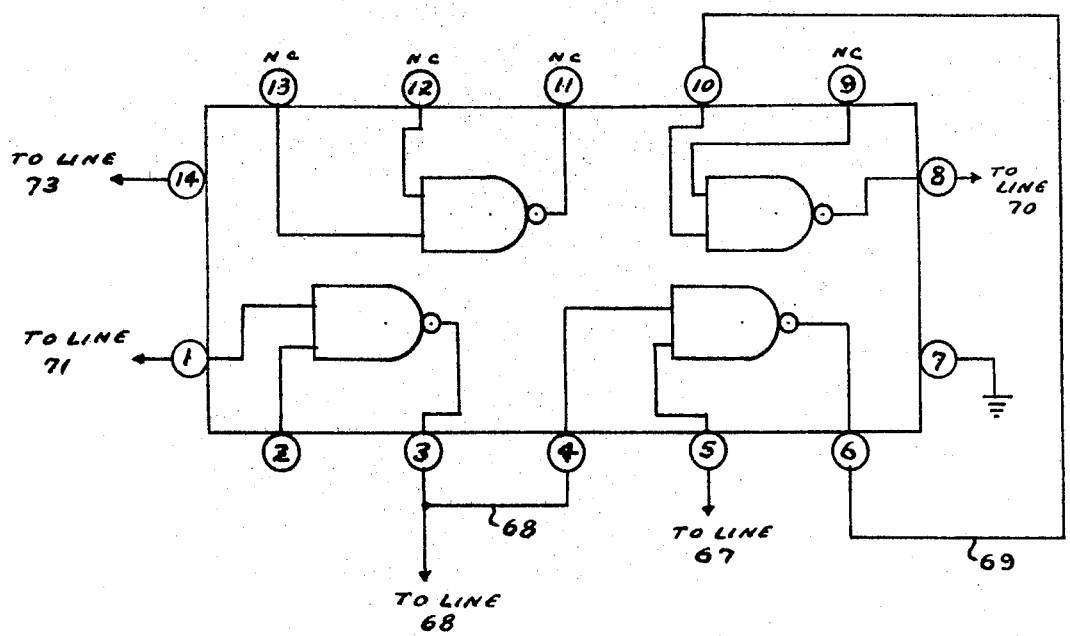
FIG. 12 is a block diagram of a quad NAND gate as used in FIG. 5.

It is convenient, and so done in the operating embodiments of this invention, to use a commercially available quad NAND gate integrated circuit module, such as a type SN15846, for the two inverters 71 and 72, and the NAND gate 73. Only one of the quad of NAND gates in the module is used as a NAND gate, two are used (with only one input) as inverters, and the fourth is not used. FIG. 11 shows the schematic circuit of a typical NAND gate used in the module that is used in this embodiment. The complete module is shown in block logic form in FIG. 12.

The counter modules 74, 75, and 76 used in this embodiment are conventional type SN15845. The block-connection diagram is shown in FIG. 9a with the schematic diagram as shown in FIG. 9b. The ground connection 77 in the last counter 76 locks it up after the fourth count and provides a continuous alarm signal until reset. In many instances, such as in military usage where a high degree of alertness must always be maintained, it is desirable that the alarm indication be given after only two successive low oxygen content breaths. In this situation only two counter modules are needed, in which case the ground connection 77 is moved to counter module 75 and the alarm signal taken from counter module 75 with counter module 76 removed from the circuit. When it is desired to have eight counts before an alarm indication is presented, an additional counter module may be inserted in the circuit. This condition may exist when the aircraft is flown at only moderately high altitudes, say never exceeding 15,000 feet and while some oxygen is required hypoxia would not set in as rapidly with a defect in the oxygen supply system as it would in aircraft operating at say 30,000 feet.

The output from the counter when the condition of impending hypoxia is present is a voltage on line 80 (FIGS. 4 and 5). Generally it has been found desirable for this voltage to operate a conventional sensitive relay which turns the alarm signalling means on and off. In this manner, using the aircraft's power source to power the alarm, whether it is a light or a sound, a much stronger alarm indication may be obtained. In addition the relay through its controlled contacts may be used to switch a particularly raucous or piercing audio signal into a communication line connected with the earphones of the individual that is under the condition of impending hypoxia. Such systems of using a low level control voltage to provide a subjective attention arresting signal are well known.

What is claimed is:
1. A system for detecting and warning aircraft personnel, breathing oxygen supplied from an oxygen source to a subject wearing an oxygen face mask, of impending hypoxia comprising:
   (a) means for providing an electrical signal responsive to the oxygen partial pressure within the face mask;
   (b) means for providing an electrical signal representative of a predetermined amount of oxygen partial pressure;
   (c) comparitor means for comparing the electrical signal responsive to the oxygen partial pressure within the face mask and the electrical signal representative of a predetermined amount of oxygen partial pressure and providing a signal responsive to the comparison when said oxygen partial pressure within said face mask is above a predetermined value;
   (d) breath detecting means for detecting the breaths of the said subject and providing an electrical signal responsive thereto; and
   (e) electronic counter means cooperating with the comparitor means and the breath detecting means providing an electrical signal for warning the said subject of impending hypoxia.

2. The detection and warning system as claimed in claim 1 wherein the said electrical signal for warning the subject of impending hypoxia is provided by the said electronic counter means after a predetermined number of breaths wherein the maximum oxygen partial pressure in the face mask is below the said predetermined amount of oxygen partial pressure.

3. Apparatus for detecting and warning a subject, wearing a demand type oxygen face mask and breathing oxygen supplied to the mask from an oxygen source pressure regulated to the ambient pressure, of the condition for impending hypoxia comprising:
   (a) sampling means for continuously withdrawing a small sample of the gas in the face mask;
   (b) means cooperating with the said oxygen source providing a reference gas of oxygen pressure regulated to the said ambient pressure;
   (c) an oxygen partial pressure sensing cell cooperating with the said mask gas sampling means and the said reference gas for providing an electrical signal responsive to the oxygen partial pressure of the mask gas and the reference gas;
   (d) transducer means for providing an electrical signal responsive to the said ambient pressure;
   (e) signal summing means for summing the said signal from the oxygen partial pressure sensing cell and the signal from the said transducer means for providing an electrical signal responsive to the oxygen partial pressure of the said gas in the face mask;
   (f) means for providing an electrical signal equivalent to a predetermined amount of mask oxygen partial pressure;
   (g) comparitor means responsive to the oxygen partial pressure signal from the summing means and the said electrical signal equivalent to the said predetermined amount of mask oxygen partial pressure for providing an electrical signal indicative of when the said mask oxygen partial pressure is larger than the predetermined amount of oxygen partial pressure;
   (h) breath detecting means responsive to the said signal from the signal summing means for providing an electrical signal responsive to each breath of the said subject;
   (i) electronic counter means responsive to the said signal from the breath detecting means for counting the said breaths and providing an electrical signal output after a predetermined number of breath counts;
   (j) logic circuit means cooperating with the said comparitor means and the said counting means for inhibiting and resetting the said counter in response to the said signal from the comparitor means; and (k) subjective alarm indicator means responsive to the said signal from the counter means for warning the subject of the condition of impending hypoxia.

4. The apparatus of claim 3 wherein:

(a) the said signal from the oxygen partial pressure sensing cell is an electrical signal proportional to the logarithm of the ratio of the oxygen partial pressure of the mask gas and the oxygen partial pressure of the reference gas; and (b) the electrical signal from the said transducer means is an electrical signal proportional to the logarithm of the said ambient pressure.

5. The apparatus as claimed in claim 4 wherein the said breath detecting means provides an electrical signal responsive to each breath inhalation of the said subject.

References Cited

UNITED STATES PATENTS

| | | | |
|---|---|---|---|
| 3,033,195 | 5/1962 | Gilroy | 128—145.8 |
| 3,252,458 | 5/1966 | Krasberg | 128—147 |
| 3,333,584 | 8/1967 | Andreasen | 128—145.5 |

WILLIAM E. KAMM, Primary Examiner

G. F. DUNNE, Assistant Examiner

U.S. Cl. X.R.

340—239